United States Patent Office 2,887,382
Patented May 19, 1959

2,887,382
METHOD OF PREPARING FOOD PRODUCTS
Eugene J. Rivoche, Washington, D.C.
No Drawing. Application January 11, 1957
Serial No. 633,534
11 Claims. (Cl. 99—1)

This invention relates to improved food products and to methods for the production thereof, and more particularly to food products composed of a mass of food particles adapted to be formed into patties, loaves, cakes, or the like, and cooked in the manner of the usual hamburger or meat loaf. The food particles may consist of such materials as meat, seafood, vegetables, cereals, fruits, and the like—either raw or partially cooked, or any desired combinations or mixtures of these materials. Small, whole food particles or ground, chopped, shredded, or flaked food materials may be utilized.

The essential distinguishing characteristic of the new food products is the presence of a solution of a particular type of cellulose gum in admixture with the food particles. This solution provides a cooking medium which insures proper cooking conditions for the food particles in the product and enables a cooked food product to be obtained which retains to a high degree the natural juices and flavor of the fresh food ingredients while, at the same time, providing a supporting framework holding the food particles in assembled relationship.

Accordingly, one of the primary objects of the invention is to provide a means for incorporating sufficient moisture in a food product for proper cooking of such product without causing the product to lose its shape or disentegrate through the formation of steam during the cooking operaton, but, on the contrary, facilitating the holding of the particles together while preventing excessively rapid evaporation of moisture.

Another of the objects of the invention is to provide a method for preparing food products of ground or shredded food particles which ordinarily do not sufficiently adhere together to form a cohesive mass in such manner that patties, cakes, or loaves formed from such food products do not disintegrate during cooking or serving.

The process of the invention, for example, provides a fresh meat-vegetable or seafood-vegetable mixture which can be molded, shaped, or otherwise formed into loaves, patties, or the like, and baked, broiled, or fried for a sufficient time to thoroughly cook the fresh food particles without disintegration or falling apart during or subsequent to the cooking step. The invention enables fresh raw vegetables to be mixed in substantially any quantity with particles of fresh meats such as beef, veal, pork, poultry, etc., or with particles of fresh seafood such as shrimp, crab, lobster, scallops, fish, or the like. If desired, one or more of the food ingredients may be partially precooked. Meat-vegetable or seafood-vegetable products as contemplated by the invention have not previously been marketed because ground meat or seafood with ground or chopped fresh vegetables in any substantial quantity will not adhere together sufficiently to form an integral patty or loaf unless very tightly compressed. An adequate degree of compression is obtainable only with special equipment not available to the usual home, restaurant, or institution. Moreover, even where the raw food materials may be compressed sufficiently to initially form a patty or loaf, the products tend to fall apart during cooking or serving. Further, it has been found that there is usually not enough moisture in such meat-vegetable or seafood-vegetable products to obtain an adequate cooking or steaming of raw vegetables.

If a substantial quantity of water is mixed with food particles of the type described, the resulting mass, if dropped on a hot surface, will flatten out and the individual particles will be actually blown apart by the flash evaporation of the moisture. These problems are solved by the present invention. The food mixture of the invention is characterized by the property of retaining sufficient moisture during the cooking operation to enable the raw or partially cooked ingredients to be steamed and completely cooked without burning or excessive drying out of the cooked product. The particular cellulose gum solution providing the cooking medium, unlike water alone, evaporates slowly and, in contact with a hot surface, immediately forms a gel holding the food particles together and the moisture in contact therewith.

If desired, meat, seafoods, or vegtables may be treated individually by the process of the invention. The resulting products have the advantage of retaining more of their natural juices and flavor after cooking than do products made by conventional processes, and possess a more pleasing texture or consistency. For example, hamburger-like products may be made to more nearly resemble a non-ground steak than has heretofore been possible. The cooked products usually will retain at least as much moisture as the raw seafood or meat from which the product is made.

The product of the invention may be frozen, thawed, and refrozen without harm. The food mixture as initially prepared may be formed into patties or loaves by hand or machine, and may then be directly cooked, or the patties and loaves may be frozen and stored, and eventually cooked with or without thawing. In patty making, where the patties are to be stored prior to use, a freezing step has been found to be especially advantageous. The food mass may be frozen in loaf form and the frozen loaf cut into patties which are retained in frozen form until cooked.

Accordingly, a further object of the invention is to provide a food product which can be easily prepared and cooked, and which after cooking retains the flavor, natural juices, and taste characteristics of a fresh food.

Another object of the invention is to provide a method for producing food products whereby food particles of almost any type of food material and combinations of food material can be made into loaf or patty form and cooked to provide a product of improved texture.

Another object of the invention is to provide a method for producing a food product which may be cooked without decreasing the moisture content of the resulting cooked product below that present in the natural food materials from which the product is produced.

Another object of the invention is to provide a method for producing a food product wherein a food particle-supporting framework is formed during the cooking operation.

Another object of the invention is to provide a food product wherein the cooking characteristics may be readily predetermined and controlled.

Another object of the invention is to provide a food product of the loaf or patty type which can be cooked in a pan, on a griddle, or the like, in the manner of the usual meat loaf or hamburger, but which requires no greasing of the container prior to cooking.

Another object of the invention is to provide a food product which when subjected to cooking temperature loses its moisture content slowly, thereby preventing burning, extensive drying, and, at the same time, permitting sufficient cooking time to cook the food particles therein.

These and other objects and advantages of the invention which will become apparent from the ensuing description, are accomplished through the use of aqueous solutions containing small quantities of certain water-soluble, edible cellulose gums which have the property of remaining fluid at normal temperatures as for example between 32° and 100° F., but which form thermally reversible gels upon an increase in temperature as, for example, above 100° F. or more. In accordance with the invention, an aqueous solution containing a small percentage of such edible gum can be incorporated with food particles in an amount up to about 100% by weight with respect to the food particles, the resulting mass can then be formed into loaves or patty-like pieces which may then be cooked to provide a tasty cooked food product of pleasing appearance and consistency.

It will be understood that the quantity, viscosity and concentration of solution used will depend upon the nature of the food materials and also upon the subsequent maner of use. Thus, more viscous and/or concentrated solutions may be necessary for products to be formed into patties and directly cooked on a pan or griddle. Solutions of lesser concentration and viscosity may be used where the product is placed in a mold for direct cooking or for freezing prior to patty formation and cooking. In either case, the quantity of solution is sufficient to provide the necessary moisture for perfect cooking of the food particles without burning or excessive drying out so that a cooked product of excellent texture, juiciness, and taste is obtained.

Edible gums which have been found to impart the desired properties to the aqueous solutions contemplated by the invention are the cellulose methyl ethers marketed under the trade name of "Methocel." Chemically, "Methocel" is a long chain cellulosic polymer having a methoxyl content of about 27.5 to 32%. The "H.G." or high-temperature gel grade of "Methocel," chemically is hydroxypropyl methylcellulose. These cellulose ethers will be referred to hereinafter as methyl cellulose. These cellulose products should not be confused with other cellulose gums, such as carboxy-methyl cellulose, which have entirely different characteristics and are totally unsuitable for the purposes of this invention. Unlike solutions of other gel-forming materials, such as gelatin, alginates, pectinates, and the like which provide harder gels as their temperature is lowered, solutions of the methyl cellulose ethers contemplated by the invention remain fluid until frozen and do not begin gel formation until heated. The gel-forming properties of methyl cellulose are unaffected by freezing and thawing.

Methyl cellulose products are commercially available in various grades ranging in viscosity from 10 to 7000 centipoises in 2% water solution at 68° F. "Methocel" U.S.P. grade, H.G. 65 grade, H.G. 60 grade, and H.G. 90 grade have been found to be satisfactory. Each of these grades of cellulose ether is available in varying viscosity ranges and their aqueous solutions, while having the common characteristic of forming gels at elevated temperatures, begin gel formation at somewhat different temperatures. Thus, the U.S.P. grade may begin to form a gel at about 115° F. in 2% solution, whereas the H.G. 90 grade does not begin the gel formation until about 190° F. in the same solution concentration. The higher temperature gel-forming grades provide more tender gels and, conversely, the lower temperature gel-forming grades gel more quickly and form harder gels more rigidly supporting the food particles. One skilled in the art may readily determine the best grade and type of "Methocel" for the particular type of food particles used in the product and the particular type of processing.

It has been found advantageous in some instances to mix the lower temperature gel-forming grades with the higher temperature gel-forming grades to obtain gel-forming characteristics intermediate between the two. "Methocel" products of the same grade but of different viscosity characteristics may also be mixed together to provide a gel of a selected characteristic. Thus, for example, a satisfactory solution can be obtained by mixing "Methocel" H.G. 65 having a viscosity characteristic of 15 centipoises in 2% solution with a "Methocel" of the same grade having a viscosity characteristic of 4000 centipoises in 2% solution. Any desired proportions of the two viscosity types may be mixed—depending upon the viscosity desired in the final solution and the consistency and cooking characteristics desired in the product food patty.

The characteristics of the final food product and the desired cooking times may be regulated by varying the quantity and/or concentration of "Methocel" solution. In general, larger quantities of solution are used with food products requiring longer cooking times such as the raw meats and raw vegetables. As water evaporates from the solution during cooking, it becomes more concentrated and the gel formed due to the temperature rise becomes increasingly hard. "Methocel" solutions, in general, do not form gels in concentrations of less than about 2% even upon heating to boiling temperature. The present invention, therefore, if weak solutions are used, relies upon evaporation of water during cooking to concentrate the solution and form a transitory gel which substantially disappears on further cooking. In the final, cooked product it is substantially impossible to detect the presence of a gel or of the gel-forming material. The small quantity of cellulosic material is tasteless and does not alter the food flavors.

In accordance with the invention, the ground or shredded food, such as hamburger meat, beef, veal, pork, shredded chicken, turkey, fish, seafood, vegetables, or the like, is mixed with an aqueous solution of the selected methyl cellulose ether. The amount of solution may be varied widely, and, for example, may comprise from about 10% to 40% by weight of the total mixture. The concentration of the cellulose ether in the solution is usually very small, and may be selected according to the subsequent processing steps, as will be apparent from the more detailed description hereinbelow. The maximum concentrations that will provide workable solutions depend upon the viscosity type of cellulose ether employed. The lower the viscosity type of methyl cellulose ether that is used, the higher the solution concentration may be and still provide a workable solution. Thus, with a viscosity type of 10 to 100 c.p.s., solution concentrations up to 8% have been found workable, while with a viscosity type of 4000 c.p.s., and above, the solution concentration should generally be no higher than about 3%. By using weaker solution concentrations, larger quantities of solution can be employed without affecting the texture and taste of the resulting cooked product. Generally, where larger quantities of solution are desirable, the concentration of such solutions should be on the weaker side, the large quantity of low concentration providing the necessary quantity of methyl cellulose ether molecules to form the desired supporting gel framework while cooking. The optimum quantity of solution and optimum solution concentration for each viscosity type of methyl cellulose ether and for each specific usage may readily be determined by one skilled in the art, it being borne in mind that it is desirable to use as little methyl cellulose ether as possible so as to have the minimum amount of cellulosic material in the final cooked product.

Where ground or shredded meat, fish, or seafood is utilized for admixture with the methyl cellulose solution, shredded or whole vegetables may be further admixed with the mass so as to form a meat-vegetable product. Thus, for example, ground or shredded meat may be admixed with about 10 to 50% by weight of "Methocel" solution, and to this mixture may be added 10 to 50% by weight of whole, chopped, or shredded vegetables based on the weight of the meat. Whole peas, cut corn, shredded celery, carrots, beans, cabbage, spinach, beets, and the like have been satisfactorily employed. It is an important feature of the invention that the "Methocel" solution provides sufficient moisture to enable raw products to be thoroughly steamed or cooked while at the same time providing, through the formation of a gel while cooking, a framework holding the particles together in the cooking medium. Water alone or solutions of other types of cellulose gums cannot accomplish this function.

Any of the various mixtures disclosed herein may be utilized for production of a loaf type cooked product. Thus, by use of methyl cellulose solution, particles of meats such as cooked seafoods, or chicken and turkey—which with added moisture have no tendency to adhere together—as well as hamburger that does adhere to some extent but not when mixed with fresh vegetables, may be mixed alone or with any desired amount of fresh or partially precooked chopped or shredded vegetables to provide a mass that can be poured into a mold, deep pan, casserole, or other container and thereupon assume the shape of the container. Even though a container is used in this instance to retain the food product in desired shape until cooked, the cooked product has the advantage of retaining more moisture than is present in the usual meat loaf product, and is much more juicy and tasty. The cooked product also has a better consistency, and may be removed from the mold or cooking vessel and cut into thin slices without disintegrating. Thus, molded, cooked loaves may be made up for slicing into sandwich thickness for restaurant or home use. If desired, the prepared, raw mixture may be stored in containers either with or without freezing, for marketing and retail sale.

Certain raw, ground, or shredded foods that have some natural tendency to adhere together, such as raw, ground beef, raw shredded scallops, and the like, with or without admixture of vegetables, may be mixed with the methyl cellulose solution to form a product that can be marketed in bulk in containers and used by the housewife, chef, short order cook, or other consumer, for hand patty formation and immediate cooking. For this use, any quantity, viscosity, and concentration of methyl cellulose solution may be used so long as the solution provides an adequate quantity of moisture for proper cooking, and sufficient methyl cellulose to hold the particles together during cooking. Satisfactory results are obtainable with viscosity types of 1500 cps. and above, and with solution concentrations as low as 1 to 2%. It will be understood that this food mass will not hold its shape for any substantial length of time prior to cooking, and should be exposed to cooking temperatures as soon as possible. Gel formation thereupon takes place to provide the necessary structure to hold the product in proper shape during the remainder of the cooking period. Higher concentrations and higher viscosity grades of methyl cellulose may be used to decrease the tendency of the patties to flatten out or lose their shape prior to cooking. Thus, for example, 20 to 35% of a 2 to 3% solution of methyl cellulose of 4000 to 7000 cps. in a beef or beef-vegetable mixture enables a patty to be formed which will retain its shape relatively well even though not immediately cooked. At these higher viscosities and concentrations, chicken, turkey, and cooked seafood may be used either alone or with added vegetables for patty formation and direct cooking.

Patty formation and distribution on a commercial scale are greatly facilitated by the use of an intermediate freezing step prior to cooking. The patties may be formed by hand or by machine prior to freezing and packaging. However, it is preferred to place the food mixture in a mold, freeze it in loaf or cylindrical shape, cut the frozen mass into patties, and package the frozen patties for sale as a frozen food product. All types of food particles and food mixtures may be produced in patty form by this method. The patty shape is maintained by the frozen solution until the patties are subjected to cooking temperature, whereupon gel formation at the surface exposed to heat takes over and retains the patty shape during complete thawing and cooking.

Where patties are produced in a conventional patty-making machine prior to direct cooking or freezing, the higher viscosity types of methyl cellulose may provide mixtures that are undesirably sticky, so that they can be removed from the machine only with difficulty. For such use, lower viscosity grades of methyl cellulose may be used. For example, 20 to 35% of 1 to 2% solution of methyl cellulose of 10 to 400 cps. added to the ground beef or beef-vegetable admixtures provides a product which can be formed into patties by a patty-making machine. These patties preferably should then be frozen.

It will be understood that the cooking time depends upon the selected grade and viscosity type of "Methocel" as previously mentioned, and also upon the thickness of the product cooked and the quantity of solution originally incorporated into the mixture. Thus, a frozen patty containing 70% of hamburger meat and 30% additives including equal parts by weight of water and vegetables, and utilizing U.S.P. grade "Methocel" of 4000 cps., frozen and sliced to ¼" thickness, will require only about 1½ minutes cooking on each side. A longer cooking time may be provided by using larger quantities of "Methocel" solution and/or a lower viscosity type. During the cooking operation, water is evaporated from the surface of the patty in contact with the heat, and the "Methocel" solution accordingly becomes more concentrated and with the rise in temperature forms a surface gel framework which holds the patty together during the progressive thawing and cooking of the whole patty. As the interior of the patty thaws and heats up, water is evaporated from the "Methocel" solution in contact with the food particles, slowly changing into steam, which effects a very satisfactory cooking medium for both the meat and vegetable particles. The gel structure formed as the product cooks is sufficiently strong to withstand the steam pressure developed inside the product and provides a frame or network holding the product substantially in its initial shape, resisting the general tendency to disintegrate. This is particularly important where the food particles contain fats or comprise food materials which do not have a natural tendency to adhere to each other. In the final cooked product, the gel characteristics of the "Methocel" have substantially disappeared, but a more or less rigid framework is formed throughout the body of the cooked patty, holding the particles together even after the cooked product has cooled and is served as a cold dish. It has been found that in no instance does the cooking operation, when properly conducted so as not to overcook the food particles, drive off more water than has been added during the initial formation of the product. Thus, where hamburger meat originally containing about 37% moisture has been utilized in the formation of the patty, the final cooked product will contain at least this amount of moisture, thereby being extremely juicy and tasty in comparison with the ordinary cooked hamburger wherein the moisture content has been materially reduced from the original 37% to thereby form a relatively dry, crumbly product. As aforementioned, the loss in moisture during the cooking operation can be controlled by selecting the concentration and viscosity characteristics of the "Methocel" utilized in the initial preparation as well as by controlling the amount of added solution. The invention will be further illustrated by the following examples of practice:

*Example 1*

100 pounds of raw ground hamburger meat are mixed with 20 pounds of a water solution containing 2.0% by weight of "Methocel" U.S.P. grade having a viscosity of 4000 cps. at room temperature. To the resulting mixture, 20 pounds of whole peas (raw or canned) are added and are thoroughly incorporated in the mass. The resulting mass is placed in a container and patties are made by hand as required. The patties are placed directly upon a heated surface as soon as formed, and cook without substantial flattening or loss of shape. The cooked patties are juicy and have an excellent flavor.

*Example 2*

100 pounds of raw ground hamburger meat are mixed with 20 pounds of a water solution containing 0.25% by weight of "Methocel" U.S.P. grade having a viscosity of 4000 cps. in 2% solution at room temperature. To the resulting mixture, 20 lbs. of whole peas (raw or canned) are added and are thoroughly incorporated in the mass. The resulting mass is placed in a stuffing machine and extruded under 3-5 pounds pressure into elongated cylindrical metal molds of 4½" diameter, care being taken to prevent the presence of air in the mold or in the mix. It is noted that the liquid constituents of the mass substantially completely fill the voids between the food particles thereby facilitating removal of air. The mass in the metal molds is then hard-frozen and removed from the molds while still in frozen form and sliced into ¼" patties. These patties, while still frozen, are then packaged in the usual manner for retail sale as a frozen food product.

The process is repeated with solution concentrations of "Methocel" including 0.5, 0.75, 1.0, and 2.0% solutions, in amounts varying between 20 and 50% by weight. All provide satisfactory products which vary slightly with respect to hardness.

*Example 3*

The processes of Examples 1 and 2 are repeated with proportions of 25 pounds of "Methocel" solution and 25 pounds of mixed, chopped fresh vegetables per 100 pounds of ground meat; with 33⅓ pounds of "Methocel" solution and 33⅓ pounds of added vegetables per 100 pounds of ground meat; and with 40 lbs. of "Methocel" solution and 40 pounds of added vegetables per 100 pounds of ground meat. In each instance, attractive meat-vegetable patties are obtained which can be quickly cooked, and which are of pleasing consistency and taste.

Any desired beef type may be substituted for the hamburger meat of Examples 1 and 2, and the vegetables can be selected as desired.

*Example 4*

100 pounds of shredded raw chicken are mixed with 20 pounds of aqueous solution containing 1.5% by weight of methyl cellulose ("Methocel" H.G. 60, 15 cps., and "Methocel" H.G. 60, 4000 cps. in equal quantities). 20 pounds of mixed raw, shredded vegetables are incorporated in the mass. The resulting mass is then placed in molds and is cooked therein. Upon removal from the molds, the product remains in loaf form, and can be sliced into thin slices as desired.

*Example 5*

100 pounds of shredded, raw chicken are mixed with 20 pounds of an aqueous solution containing 1.00% by weight of cellulose ether ("Methocel" H.G. 65 grade, 15 cps., and "Methocel" H.G. 65 grade 4000 cps. in equal quantities). Twenty pounds of mixed, shredded raw vegetables are incorporated in the resulting mass. The relatively fluid mass is then placed in a stuffing machine, formed into molds, quick-frozen, and sliced into patties. The frozen patties are packaged for market. The resulting chicken-vegetable patties when rapidly cooked are found to be delicious.

*Example 6*

The processes of Examples 4 and 5 are repeated with different concentrations and proportions of "Methocell" solution. Solutions containing concentrations of "Methocell" from 0.5 to 2.0% in amounts varying between 20 and 50% by weight with respect to the meat all provide satisfactory chicken or turkey patties.

*Example 7*

100 pounds of shredded or ground raw shrimp are mixed with 25 pounds of an aqueous solution containing 2.0% of methyl cellulose ("Methocel" H.G. 65 grade, 4000 cps. and "Methocel" U.S.P. grade, 15 cps. in equal quantities). 25 pounds of mixed, shredded raw vegetables (e.g. shredded celery, green beans, etc.) are incorporated in the resulting mass. The mass is then placed in molds and either cooked therein to form a loaf that can be cut into thin slices or patties to be packaged as a frozen food product.

When the freezing step is employed, much lower concentrations of methyl cellulose solution may be used, 0.5% being satisfactory. However, when whole shrimp or large lumps are used, or when the shrimp is precooked, the concentration of methyl cellulose should be on the high side, i.e. 2 or 3%. Crabmeat and lobster, as well as other seafoods, either raw or precooked, are treated in the same manner as the shrimp.

*Example 8*

100 pounds of a ground meat mixture consisting of 50% pork and 50% veal are mixed with 25 pounds of an aqueous solution containing 1.25% by weight of methyl cellulose ("Methocel" H.G. 65 grade, 15 cps. and "Methocel" H.G. 65 grade, 4000 cps., in equal quantities). 25 pounds of mixed, shredded raw vegetables are incorporated into the resulting mass. The mass is then placed in molds and either cooked therein to form a loaf that can be cut into thin slices, or is frozen in the molds to form a frozen loaf that can be cut into thin slices or patties to be packaged as a frozen food product, and cooked without previous thawing.

*Example 9*

100 pounds of raw, mixed vegetables including small whole lima beans, whole green peas, chopped green beans, celery, and cut corn are mixed with 25 pounds of 2% solution of "Methocel" U.S.P. grade, 4000 cps. viscosity. The resulting mass is then placed in molds and either cooked therein to form a vegetable loaf that can be cut into thin slices, or is frozen in the molds to form a frozen vegetable loaf that can be cut into thin slices or patties to be packaged as a frozen food product, and cooked without previous thawing.

*Example 10*

100 pounds of shredded, raw turkey or chicken are mixed with 30 pounds of 1% solution of "Methocel" H.G. 60 grade of 4000 cps. and H.G. 90 grade of 50 cps. in equal proportions. The resulting mass is then placed in molds and either cooked therein to form a loaf that can be cut into thin slices, or is frozen in the molds to form a frozen loaf that can be cut into thin slices or patties that can be packaged as a frozen food product and cooked without previous thawing.

It will be understood that in all the foregoing mixtures flavorings, shortening, and condiments may be added to taste during the initial mixing, and prior to cooking or freezing.

The foregoing process provides a ready means for selecting various vegetables and/or meats to provide food products tailored for all classes of consumers. Thus, meat-vegetable products provide a convenient means for enticing children to consume the vegetable constituents regarded as essential to good health. Shrimp, crab, or lobster and other seafoods are quickly and economically provided for special occasions. A product containing all of the essential ingredients for a balanced diet may be readily provided. A dietary food can be provided for special purposes and for use by vegetarians. Due to the amount of moisture present in the product, it is usually not necessary to add fat to the pan or griddle for cooking. It may be desirable, however, in such instances to prepare the products with the higher gelling grades of "Methocel" so as to prevent such rapid gel formation on the surface of the patty as to result in scorching or sticking.

It will be understood that the proportions set forth in the foregoing examples may be varied in a manner which will be readily apparent to those skilled in the art, generally between the limits broadly set forth.

I claim:

1. In a method for preparing a cooked food product from food particles, the step of providing a moist cooking medium for said particles while simultaneously holding said particles together and in contact with said cooking medium, said step comprising admixing said food particles, prior to cooking, with from about 10% to about 100% by weight of a fluid aqueous solution of an edible cellulose gum having the property of forming a thermally reversible gel in solution of sufficient concentration upon an increase in temperature.

2. The method of preparing a food product adapted to be cooked without substantial change in shape, comprising: admixing food particles with from about 10% to about 100% by weight of a fluid aqueous solution of an edible cellulose ether having the property of gel formation in a solution of sufficient concentration upon an increase in temperature, and shaping the resulting mass into patties, the quantity of cellulose ether provided by said solution being sufficient to retain the patties in patty form during a subsequent cooking operation.

3. The method as defined in claim 2 wherein said food particles comprise an admixture of ground raw beef and fresh vegetables.

4. The method of claim 2 wherein said edible cellulose ether is a methyl cellulose ether and said solution is used in such concentration and quantity as to provide a patty which will substantially retain its shape at room temperature without confinement.

5. The method of preparing a cooked food product, comprising: admixing food particles with from about 10% to about 100% by weight of a fluid aqueous solution of an edible cellulose ether having the property of gel formation in a solution of sufficient concentration upon an increase in temperature, shaping the resulting mass into patties, and cooking said patties, the quantity of cellulose ether provided by said solution being sufficient to retain the patties in patty form during said cooking operation.

6. The method of preparing a cooked food product, comprising: admixing particles of ground raw beef and particles of fresh vegetables with from about 10% to about 100% by weight of a fluid aqueous solution of an edible cellulose ether having the property of gel formation in a solution of sufficient concentration upon an increase in temperature, shaping the resulting mass into patties, and cooking said patties, the quantity of cellulose ether provided by said solution being sufficient to retain the patties in patty form during said cooking operation.

7. The method of preparing a food product adapted to be shaped and cooked without substantial change in shape, comprising: admixing food particles selected from the group consisting of meats, seafoods, vegetables, fruits, and combinations thereof with from about 10% to 100% by weight of a fluid aqueous solution of a methyl cellulose, the quantity of methyl cellulose provided by said solution being sufficient to retain the food mass in shaped form during the cooking operation.

8. In a method of preparing cooked food products, the steps comprising mixing food particles selected from the class consisting of meats, seafoods, vegetables, fruits, and combinations thereof, with from about 10 percent to 50 percent by weight of a fluid aqueous solution of an edible cellulose gum which has the property of forming a thermally reversible gel in solutions of sufficient concentration upon an increase in temperature, said solution remaining fluid at temperatures in the range between freezing temperature and about 115° F., placing the resulting mass in a mold, subjecting said mass in said mold to a heating temperature outside said range to solidify said aqueous solution and hold said food particles together in molded shape, removing the mass from the mold, and while it is in solidified form cutting it into slices.

9. In a method of preparing cooked food products, the steps comprising mixing food particles selected from the class consisting of meats, seafoods, vegetables, fruits, and combinations thereof, with from about 10 percent to 50 percent by weight of a methyl cellulose solution, the concentration of said solution being such that the solution remains fluid in a temperature range between freezing temperature and about 115° F., placing the resulting mass in a mold, subjecting said mass in said mold to a heating temperature outside said range to solidify said aqueous solution and hold said food particles together on molded shape, removing the molded mass from the mold, and while it is in solidified form cutting it into slices.

10. The process of claim 9 wherein the mass in the mold is subjected to a temperature above 115° F. so that said methyl cellulose solution solidifies to a gel, and wherein the mass solidified by heat is then cut into slices.

11. The process of claim 9 wherein said food particles are particles of fresh, raw foods.

References Cited in the file of this patent

UNITED STATES PATENTS

| | | |
|---|---|---|
| 1,864,285 | Taylor | June 21, 1932 |
| 1,943,374 | Dreyfus | Jan. 16, 1934 |
| 2,302,511 | Wallach | Nov. 17, 1942 |
| 2,496,278 | Eddy | Feb. 7, 1950 |
| 2,640,779 | George | June 2, 1953 |
| 2,650,167 | Garsaud | Aug. 25, 1953 |
| 2,721,142 | Shinn et al. | Oct. 18, 1955 |
| 2,798,814 | Rivoche | July 9, 1957 |